(12) United States Patent
Schipper et al.

(10) Patent No.: US 11,821,998 B2
(45) Date of Patent: Nov. 21, 2023

(54) THREE-DIMENSIONAL ATTITUDE DETERMINATION SYSTEM WITH MULTI-FACETED INTEGRITY SOLUTION

(71) Applicant: Honeywell International Inc., Morris Plains, NJ (US)

(72) Inventors: Brian Schipper, Maple Grove, MN (US); Vibhor L Bageshwar, Rosemount, MN (US); Blaise Morton, Minnetonka, MN (US)

(73) Assignee: Honeywell International Inc., Charlotte, NC (US)

( * ) Notice: Subject to any disclaimer, the term of this patent is extended or adjusted under 35 U.S.C. 154(b) by 492 days.

(21) Appl. No.: 16/880,768

(22) Filed: May 21, 2020

(65) Prior Publication Data
US 2021/0364655 A1    Nov. 25, 2021

(51) Int. Cl.
    *G01S 19/55*    (2010.01)
(52) U.S. Cl.
    CPC .................... *G01S 19/55* (2013.01)
(58) Field of Classification Search
    CPC ........... G01S 19/55; G01S 19/20; G01S 19/44
    See application file for complete search history.

(56) References Cited

U.S. PATENT DOCUMENTS

| | | | |
|---|---|---|---|
| 4,384,293 | A | 5/1983 | Deem et al. |
| 4,719,469 | A | 1/1988 | Beier et al. |
| 4,754,280 | A | 6/1988 | Brown et al. |
| 4,894,662 | A | 1/1990 | Counselman |

(Continued)

FOREIGN PATENT DOCUMENTS

| | | |
|---|---|---|
| CN | 101825717 A | 9/2010 |
| CN | 101833080 A | 9/2010 |

(Continued)

OTHER PUBLICATIONS

P.J.G. Teunissen et al., Performance of the LAMBDA Method for Fast GPS Ambiguity Resolution, Navigation, vol. 44(3), p. 373-383 (Year: 1997).*

(Continued)

*Primary Examiner* — Bernarr E Gregory
*Assistant Examiner* — Fred H Mull
(74) *Attorney, Agent, or Firm* — Fogg & Powers LLC

(57) ABSTRACT

A method of determining three-dimensional attitude is provided. The method includes measuring a carrier phase of each satellite signal received at plurality of spaced antenna. A carrier phase difference between the measured carrier phase for each satellite signal from each satellite received at each antenna is determined. The integrity of the integer ambiguity resolution relating to the carrier phase difference is assured by applying a least-square-error solution using differential carrier phase measurements with applied integer ambiguities between at least two of the plurality of antennas and observing measurement residuals after the least-square-error solution is computed and applying an instantaneous test, an interval test and a solution separation function. Three-dimensional attitude is determined from the carrier phase differences upon completion of the integer ambiguity resolution and the assurance of integrity of the integer ambiguity resolution.

20 Claims, 10 Drawing Sheets

(56) References Cited

U.S. PATENT DOCUMENTS

| | | | |
|---|---|---|---|
| 4,963,889 | A | 10/1990 | Hatch |
| 5,021,792 | A | 6/1991 | Hwang |
| 5,072,227 | A | 12/1991 | Hatch |
| 5,101,356 | A | 3/1992 | Timothy et al. |
| 5,119,101 | A | 6/1992 | Barnard |
| 5,185,610 | A | 2/1993 | Ward et al. |
| 5,317,514 | A | 5/1994 | Bancroft et al. |
| 5,359,521 | A | 10/1994 | Kyrtsos et al. |
| 5,402,347 | A | 3/1995 | McBurney et al. |
| 5,430,954 | A | 7/1995 | Best et al. |
| 5,450,448 | A | 9/1995 | Sheynblat |
| 5,452,211 | A | 9/1995 | Kyrtsos et al. |
| 5,470,233 | A | 11/1995 | Fruchterman et al. |
| 5,471,217 | A | 11/1995 | Hatch et al. |
| 5,526,291 | A | 6/1996 | Lennen |
| 5,534,875 | A | 7/1996 | Diefes et al. |
| 5,543,804 | A | 8/1996 | Buchler et al. |
| 5,548,293 | A | 8/1996 | Cohen |
| 5,553,812 | A | 9/1996 | Gold et al. |
| 5,563,607 | A | 10/1996 | Loomis et al. |
| 5,563,917 | A | 10/1996 | Sheynblat |
| 5,570,304 | A | 10/1996 | Mark et al. |
| 5,623,414 | A | 4/1997 | Misra |
| 5,757,646 | A | 5/1998 | Talbot et al. |
| 5,917,445 | A | 6/1999 | Schipper et al. |
| 5,931,889 | A * | 8/1999 | Misra .................. G01S 19/20 701/476 |
| 5,995,042 | A * | 11/1999 | Durboraw, III ....... G01S 19/215 342/357.58 |
| 6,088,653 | A | 7/2000 | Sheikh et al. |
| 6,114,988 | A | 9/2000 | Schipper et al. |
| 6,166,683 | A | 12/2000 | Hwang |
| 6,256,583 | B1 | 7/2001 | Sutton |
| 6,259,398 | B1 | 7/2001 | Riley |
| 6,424,915 | B1 | 7/2002 | Fukuda et al. |
| 6,611,228 | B2 | 8/2003 | Toda et al. |
| 7,026,982 | B2 | 4/2006 | Toda et al. |
| 7,355,549 | B2 | 4/2008 | Fukuda et al. |
| 7,400,956 | B1 | 7/2008 | Feller et al. |
| 8,825,396 | B2 | 9/2014 | Scherzinger |
| 9,322,922 | B2 | 4/2016 | Pratt et al. |
| 10,168,714 | B2 | 1/2019 | Webber et al. |
| 10,261,194 | B2 | 4/2019 | Kundak et al. |
| 2002/0029110 | A1 | 3/2002 | Fukuda et al. |
| 2003/0154049 | A1* | 8/2003 | Toda .................. G01S 19/55 702/151 |
| 2006/0106533 | A1 | 5/2006 | Hirokawa |
| 2007/0040737 | A1 | 2/2007 | Fukuda et al. |
| 2007/0052583 | A1 | 3/2007 | Zhodzishsky et al. |
| 2009/0184869 | A1 | 7/2009 | Talbot et al. |
| 2012/0176271 | A1 | 7/2012 | Dai et al. |
| 2016/0320493 | A1 | 11/2016 | Wu et al. |
| 2017/0192103 | A1 | 7/2017 | Kundak et al. |
| 2018/0074210 | A1 | 3/2018 | Glocker et al. |
| 2019/0377095 | A1 | 12/2019 | Brenner |

FOREIGN PATENT DOCUMENTS

| | | | |
|---|---|---|---|
| CN | 102736094 A | | 10/2012 |
| CN | 102819027 A | * | 12/2012 |
| CN | 104375157 A | | 2/2015 |
| CN | 109669196 A | | 4/2019 |
| CN | 110096830 A | * | 8/2019 ......... G06F 17/5095 |
| EP | 0609935 A2 | | 8/1994 |
| EP | 2479588 A2 | | 7/2012 |
| WO | 9608730 A1 | | 3/1996 |

OTHER PUBLICATIONS

Broshears, "Ultra-wideband Radio Aided Carrier Phase Ambiguity Resolution in Real-Time Kinematic GPS Relative Positioning", a Thesis submitted to the Graduate Faculty of Auburn University in partial fulfillment of the requirements for the Degree of Master of Science, Aug. 3, 2013, pp. 1 through 121, Auburn, Alabama.

European Patent Office, "Extended European Search Report from EP Application No. 21171059.5", from Foreign Counterpart to U.S. Appl. No. 16/880,768, dated Oct. 22, 2021, pp. 1 through 13, Published: EP.

Baroni et al., "Analysis of Ambiguity Resolution Methods for Attitude Determination Using GPS Carrier Phase Measurements", 2012, pp. 1-9.

European Patent Office, "Extended European Search Report from EP Application No. 16204549.6", from Foreign Counterpart to U.S. Appl. No. 14/989,126, dated May 30, 2017, pp. 1-11, Published: EP.

Gebre-Egziabher et al., "Analysis of Single Frequency, Carrier Phase Based GPS Positioning Performance and Sensor Aiding Requirements", "ITS Institute Intelligent Transportation Systems", Jan. 2013, pp. 1-50, Publisher: Univeristy of Minnesota, Published in: US.

Giorgi et al., "Instantaneous Ambiguity Resolution in Global-Navigation-Satellite-System-Based Attitude Determination Applications: a Multivariate Constrained Approach", "Journal of Guidance, Control, and Dynamics", Jan.-Feb. 2012, pp. 51-67, vol. 35, No. 1.

Lightsey, "Fast Integer Ambiguity Resolution Attitude Determination", A99-36590, 1999, pp. 1-9, American Institute of Aeronautics & Astronautics.

Meibo et al., "Exploring the Ambiguity Resolution in Spacecraft Attitude Determination Using GNSS Phase Measurement", "International Journal of Social, Behavioral, Educational, Economic and Management Engineering", 2013, pp. 854-858, vol. 7, No. 7, Publisher: World Academy of Science, Engineering and Technology, Published in: US.

Teunissen et al., "Performance of the LAMBDA Method for Fast GPS Ambiguity Resolution", Jul. 1997, pp. 373-383, vol. 44, No. 3, Publisher: Navigation: Journal of The Institute of Navigation, Published in: US.

Teunissen, "The Least-Squares Ambiguity Decorrelation Adjustment: a Method for Fast GPS Integer Ambiguity Estimation", "Journal of Geodesy", Nov. 14, 1994, pp. 65-82.

U.S. Patent and Trademark Office, "Notice of Allowance", U.S. Appl. No. 14/989,126, dated May 14, 2018, pp. 1-20, Published: US.

Wang et al., "A constrained LAMBDA method for GPS attitude determination", GPS Solution, 2009, pp. 97-107, Springer-Verlag.

Cong et al., "GPS/INS integrated navigation attitude determination method based on CLAMBDA and AFM aided by INS", Systems Engineering and Electronics Technology, vol. 37, No. 4, Apr. 30, 2015, pp. 882 through 887.

National Intellectual Property Administration, P.R. China, "First Office Action from CN Application No. 201710007234.2", from Foreign Counterpart to U.S. Appl. No. 14/989,126, dated Jun. 27, 2022, pp. 1 through 15, Published: CN.

Zeng et al., "Arithmetic Research of heading system based on carrier phase", Microelectronics Information, No. 31, Nov. 5, 2009, pp. 145 through 146.

Canadian Intellectual Property Office, "Office Action", from CA Application No. 2,950,484, from Foreign Counterpart to U.S. Appl. No. 14/989,126, dated Jan. 30, 2023, pp. 1 through 3, Published: CA.

* cited by examiner

THREE-DIMENSIONAL ATTITUDE DETERMINATION SYSTEM WITH MULTI-FACETED INTEGRITY SOLUTION

BACKGROUND

Navigation systems mounted on vehicles use inertial sensors (rate gyros and accelerometers) in combination with sensors such as global navigation satellite system (GNSS) receivers, magnetometers, altimeters (and possibly other sensors such as radars, cameras, lidars, start trackers, etc.) and at least one fast processor to estimate the three-dimensional (3D) position, 3D velocity, and 3D angular orientation or attitude, or kinematic states, of the vehicle. Navigation systems use filters to fuse the sensor measurements to estimate the vehicle kinematic states. The sensors contribute measurements that can be fused together by the navigation filter to estimate the various vehicle kinematic states. The vehicle attitude (pitch angle and roll angle) can be estimated by the filter and the processor using the angular velocity measured by the rate gyros, the acceleration measured by the accelerometers, and, depending on the vehicle trajectory, the GNSS sensors. The vehicle heading angle can be estimated by the filter and the processor using the angular velocity measured by rate gyros, the local magnetic field measured by the magnetometers, and, depending on the vehicle the trajectory, the vehicle track angle computed from by the GNSS pseudo-range or velocity measurements.

Magnetometer computed heading has two limitations. First, the magnetometer has to be calibrated, and magnetic disturbances from the Earth's crust, solar flares, and onboard vehicle sources cause heading errors that exceed heading requirements. The heading computed using magnetometers mounted on vehicles with rapidly changing local magnetic fields is often inaccurate because the calibration can't keep up with the changing magnetic field. Second, the Earth's magnetic field requires sufficient horizontal resolution to determine heading, and the direction of the Earth's magnetic field close to the magnetic poles is nearly vertical; as a result, magnetic heading is unavailable for any flights close to the magnetic poles. GNSS heading computed from pseudo-range or velocity measurements requires vehicle maneuvers that don't typically occur during flights. In summary, long duration flights over the poles end up in situations where the above described system can't satisfy heading requirements.

Another approach to determine heading is to use the GNSS carrier phase measurements from two or more onboard GNSS antenna. GNSS carrier phase heading is computed by observing the relative distance from the antennas to the GNSS satellites. Carrier phase measurements provided by GNSS receivers consist of a fractional wavelength component and a random integer wavelength component of the distance between the antenna and the satellite. To observe the actual relative distance between antennas, the carrier phase measurements from the receivers connected to the two antennas are subtracted from one another. This carrier phase difference, called the single difference, then consists of the fractional wavelength part of the relative distance and an unknown integer wavelength part of the relative distance. To compute the actual relative distance, the unknown integer wavelength part must be determined. Thus, to compute a GNSS heading solution, the unknown integer wavelength part of the single difference must be determined. This is referred to as integer ambiguity resolution.

The advantages of GNSS carrier phase heading are that heading is globally available including close to the magnetic poles, during straight trajectory flights without flight maneuvers, and environments with rapidly changing local magnetic fields.

The challenge of using GNSS carrier phase to determine 3D angular orientation for use in the navigation product lines is that the integrity of the integer ambiguity resolution algorithms must be assured. The limitations of GNSS carrier phase heading are that the integer ambiguities must be resolved with integrity in the presence of carrier phase noise and multipath noise while the vehicle is on the ground (stationary or moving) or in the air (stationary or moving).

GNSS 3D angular orientation determination using integer ambiguity resolution of carrier phase measurements can be a powerful solution for determining 3D vehicle attitude, in particular heading. While the ambiguity resolution problem has been studied extensively, methods to assure the integrity of the solution necessary for commercial aviation applications on the ground and in the air in the presence of carrier phase noise and multipath noise are immature at best. Indeed, the integrity of the integer ambiguity resolution algorithms pose the biggest challenge when using GNSS carrier phase heading in high-integrity navigation applications.

SUMMARY

The following summary is made by way of example and not by way of limitation. It is merely provided to aid the reader in understanding some of the aspects of the subject matter described. Embodiments provide multiple methods that are used together to provide the necessary integrity for application of GNSS 3D attitude determinations. Further, embodiments provide an attitude and heading system with an integer ambiguity resolution architecture that operates in the presence of carrier phase noise and GNSS multipath noise and assures the integrity of the heading computed from the carrier phase measurements.

In one embodiment, a vehicle having a 3D attitude determination system is provided. In an avionic context, a 3D attitude determination includes heading as well as pitch and roll angles. The system includes at least two GNSS antennas to receive GNSS signals and at least one receiver. The at least one receiver is in communication with the at least two GNSS antennas. The at least one receiver is configured to resolve integer ambiguities associated with GNSS carrier phase measurements from the received GNSS signals. The at least one receiver is further configured to assure the integrity of integer ambiguity solutions associated with the GNSS carrier phase measurements. The at least one receiver is configured to utilize the integer ambiguities to determine a 3D attitude of the vehicle taking into consideration the determined integrity of integer ambiguity solutions. Determining the integrity of integer ambiguity solutions includes at least one of, applying a least-square-error solution using differential carrier phase measurements with applied integer ambiguities between the at least two antennas, observing measurement residuals after the least-square-error (LSE) solution is computed and applying an instantaneous test that compares at least one measurement residual with a user selected instantaneous threshold to instantly eliminate integer ambiguity candidates whose residual is larger than could occur as a result of measurement error and applying an interval test over a period of time to eliminate integer ambiguity candidates that are larger than an interval threshold over a user selected number of intervals within the period of time to address carrier phase measurement errors, and applying a solution separation function to carrier phase measurements that selectively compares different carrier phase measurement sub-sets solutions with each other.

In another example embodiment, a vehicle having a 3D attitude determination system that includes a plurality of spaced antennas and at least one processor is provided. The plurality of spaced antennas are configured to receive satellite signals. The at least one processor is configured to resolve integer ambiguities associated with GNSS carrier phase measurements from the received satellite signals. The at least one processor is further configured to determine integrity of integer ambiguity solutions associated with the GNSS carrier phase measurements. The at least one processor is also configured to utilize the integer ambiguities to determine a 3D attitude of the vehicle taking into consideration the determined integrity of integer ambiguity solutions. Determining the integrity of integer ambiguity solutions includes, applying a LSE solution using differential carrier phase measurements with applied integer ambiguities between the at least two antennas, observing measurement residuals after the LSE solution is computed and applying an instantaneous test that compares at least one measurement residual with a user selected instantaneous threshold to instantly eliminate integer ambiguity candidates whose residuals are larger than could occur as a result of measurement error and applying an interval test over a period of time to eliminate integer ambiguity candidates that are larger than an interval threshold over a user selected number of intervals within the period of time to address carrier phase measurement errors, and applying a solution separation function to carrier phase measurements that selectively compares different carrier phase measurement sub-sets solutions with each other.

In yet another embodiment, a method of determining a 3D attitude is provided. The method includes receiving GNSS signals from a plurality of satellites; measuring a carrier phase of each satellite signal received at a plurality of spaced antennas; determining carrier phase differences between the measure carrier phase for each satellite signal from each satellite received at each antenna; resolving an integer ambiguities with integrity by, applying a LSE solution using differential carrier phase measurements with applied integer ambiguities between at least two of the plurality of antennas, and observing measurement residuals after the LSE solution is computed and applying an instantaneous test that compares at least one measurement residual with a user selected instantaneous threshold to instantly eliminate integer ambiguity candidates whose residuals are larger than could occur as a result of measurement error and applying an interval test over a period of time to eliminate integer ambiguity candidates that are larger than an interval threshold over a user selected number of intervals within the period of time to address carrier phase measurement errors; and determining a 3D attitude from the determined carrier phase differences upon completion of the integrity checks of the integer ambiguity resolution.

BRIEF DESCRIPTION OF THE DRAWINGS

Embodiments can be more easily understood and further advantages and uses thereof will be more readily apparent, when considered in view of the detailed description and the following figures in which.

In accordance with common practice, the various described features are not drawn to scale but are drawn to emphasize specific features relevant to the subject matter described. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the embodiments, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments provide a multi-faceted solution to assuring the integrity of GNSS 3D attitude determination. In particular, embodiments use multiple integer ambiguity resolution techniques to improve and compute the integrity of resolved integer ambiguities and, as a result, GNSS carrier phase heading. The high-integrity integer ambiguity resolution architecture of the embodiments provides a navigation system with heading estimates that satisfy heading requirements that can't be satisfied by magnetic heading or GNSS based heading computed from GNSS pseudo-range/velocity measurements.

Generally, strategies used for ambiguity resolution, which provide a basis for embodiments of the multiple approaches described herein, are determined by, first defining the list of ambiguity candidates and then processing the list of candidates over multiple epochs to eliminate candidates that fail various test criteria. The processing is done until only one candidate remains. This process may also be executed on multiple subsets of available satellites which is called solution separation.

Figure 1A:
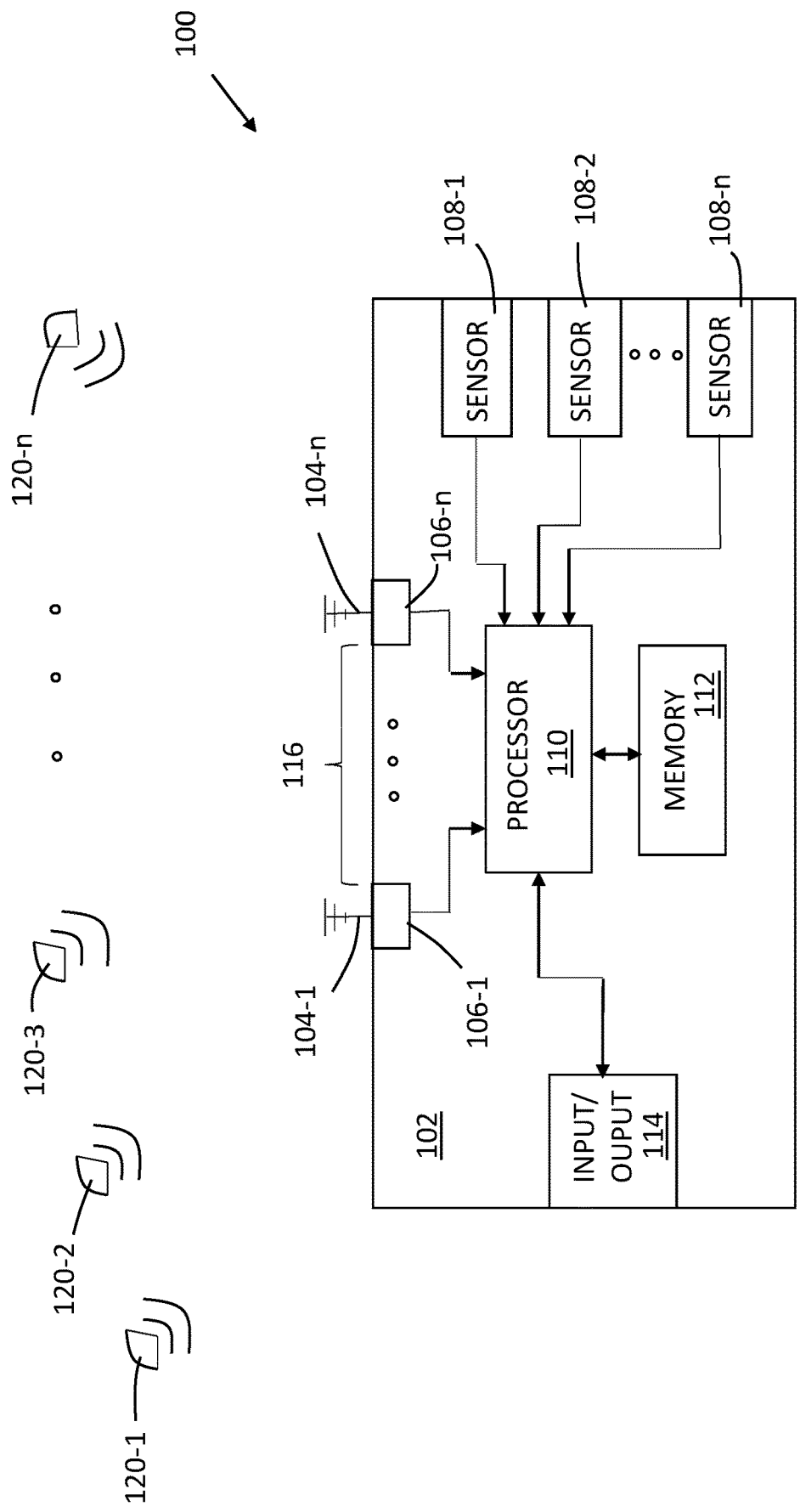
FIG. 1A is a block diagram of an 3D attitude determination system according to one exemplary embodiment.

Referring to FIG. 1A, an illustration of an 3D attitude determination system 100 in an example embodiment is illustrated. This example embodiment includes a vehicle 102 with a plurality of antennas 104-1 through 104-n designed to detect satellite signals from a plurality of satellites 120-1 through 120-n. The antennas 104-1 through 104-n are spaced a select distance 116 from each other. Within the vehicle is at least one receiver 106-1 through 106-n designed to receive the satellite signals detected by the spaced antennas 104-1 through 104-n. The receivers 106-1 through 106-n are in communication with a processor 110 (or controller).

Figure 1B:
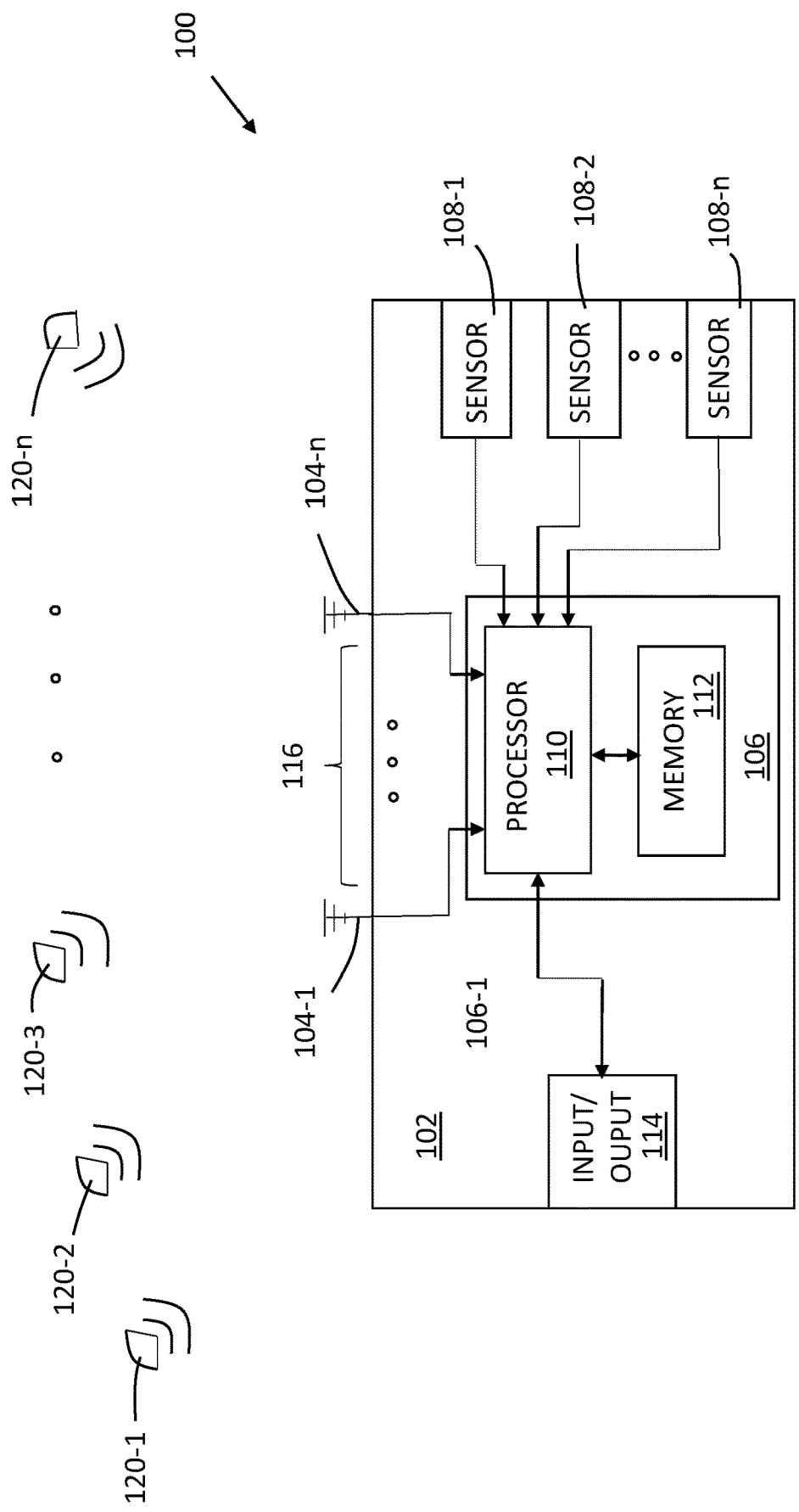
FIG. 1B is a block diagram of another 3D attitude determination system according to one exemplary embodiment.

Further included in the vehicle 102 are sensors 108-1 through 108-n that are in communication with the processor 110. Examples of sensors include, but are not limited to inertial sensors (which include rate gyros and accelerometers), magnetometers, altimeters, etc. The sensors provide sensor data to the processor 110. Further illustrated in FIG. 1 is a memory 112 that is also in communication with the processor 110. The memory 112, in an embodiment, stores operation instructions that are implemented by the processor. The memory may also store sensor and receiver data. Further illustrated in the vehicle is an input/output 114. The input/output 114 provides a communication path to and from the processor 110. For example, the input may provide a communication path for instructions that are stored in memory and the output may be sent to a display to display determined 3D vehicle attitude or to a vehicle control system that controls at least in part the vehicle based on the 3D attitude determinations. FIG. 1B further illustrates an embodiment where the processor 110 and memory 112 are part of at least one receiver 106.

In general, the processor 110 may include any one or more processors, microprocessors, a digital signal processor (DSP), an application specific integrated circuit (ASIC), a field program gate array (FPGA), or equivalent discrete or integrated logic circuitry. In some example embodiments, processor 110 may include multiple components, such as any combination of one or more microprocessors, one or more controllers, one or more DSPs, one or more ASICs, one or more FPGAs, as well as other discrete or integrated logic circuitry. The functions attributed to the processor herein may be embodied as software, firmware, hardware, or any combination thereof. The processor 110 may be part of a system controller or a component controller. The memory 112, as discussed above, may include computer-readable operating instructions that, when executed by the processor provides functions of the 3D attitude determination system with multi-faceted integrity solution. The computer readable instructions may be encoded within the memory 112. Memory 112 is an appropriate non-transitory storage medium or media including any volatile, nonvolatile, magnetic, optical, or electrical media, such as, but not limited to, a random access memory (RAM), read-only memory (ROM), non-volatile RAM (NVRAM), electrically-erasable programmable ROM (EEPROM), flash memory, or any other storage medium.

Figure 2:
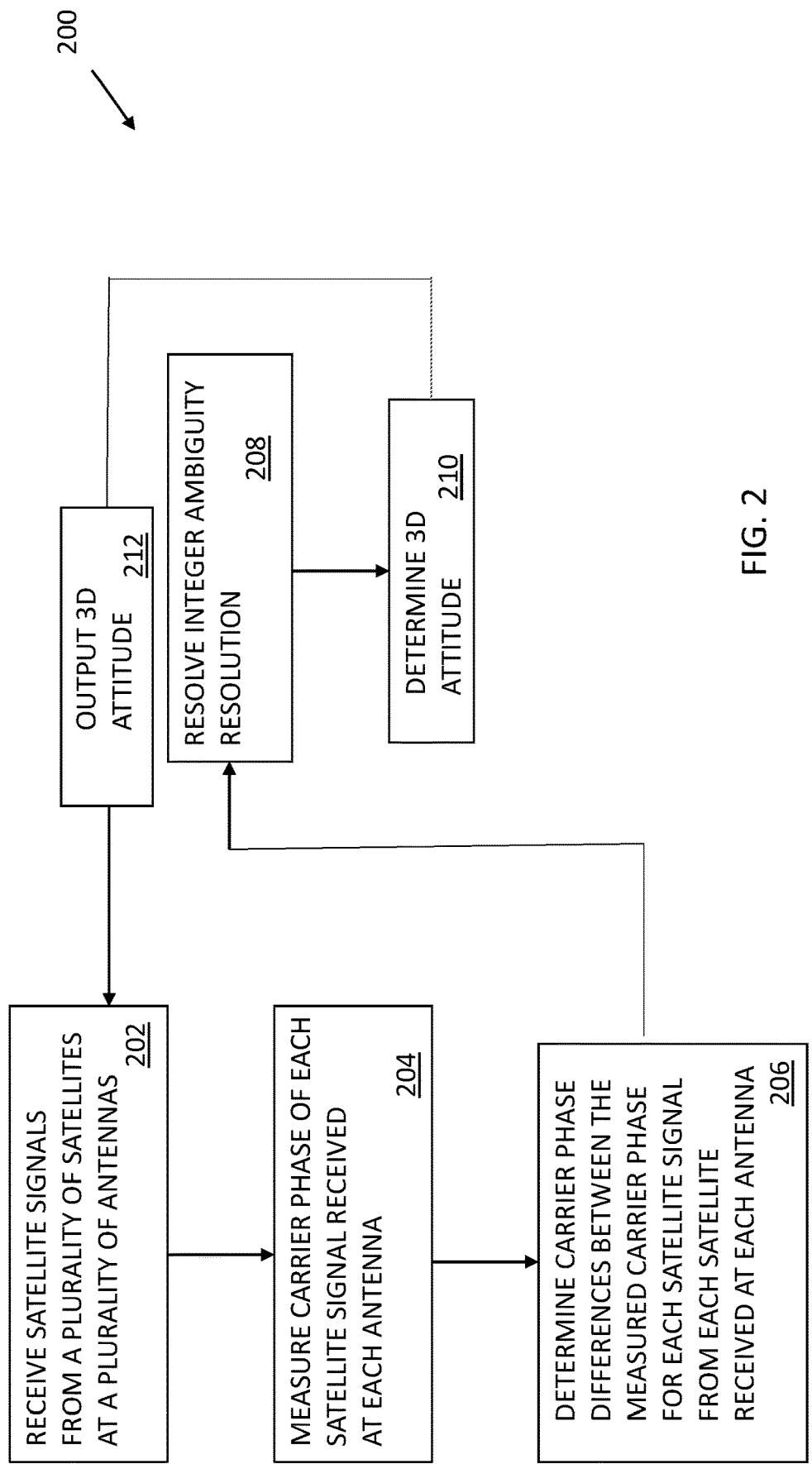
FIG. 2 illustrates an 3D attitude determination flow diagram according to one exemplary embodiment.

Referring to FIG. 2, an 3D attitude determination flow diagram 200 of an example embodiment is illustrated. The flow diagram, and subsequent flow diagrams described below, are provided as a sequence of blocks. The blocks may be used in different sequences in different embodiments. Hence, embodiments are not limited to the sequence of blocks as set forth in the flow diagram 200 and the subsequent described flow diagrams described below.

At block (202) of the 3D attitude determination flow diagram 200, satellite signals from a plurality of satellites are received at a plurality of spaced antennas. A carrier phase of each received satellite signals is measured at block (204). The carrier phase difference between measured carrier phases for each satellite signal from the corresponding satellite received at the spaced antennas is determined at block (206).

A phase difference between a signal received at separated antennas can only be determined in a range of up to one wavelength of the signal unless an integer number of wavelengths is known. However, because the integer number of wavelengths of the carrier phase difference is unknown, there is an ambiguity in possible 3D attitude solutions. This integer ambiguity must be resolved which is typically done with mathematical algorithms that rely on the availability of precise phase difference measurements from different satellites in view of all the receivers at a same epoch.

Examples of embodiments, that resolve integer ambiguity resolution, as indicated in box (208) is discussed below in detail. Once the integer ambiguity resolution is resolved at block (208), the 3D attitude is determined at block (210). The 3D attitude is output at block (212). As discussed above, the output may use the 3D attitude determination for vehicle control, navigation, displays etc. or it may be transmitted to a remote location. The process then continues at block (202).

Figure 3:
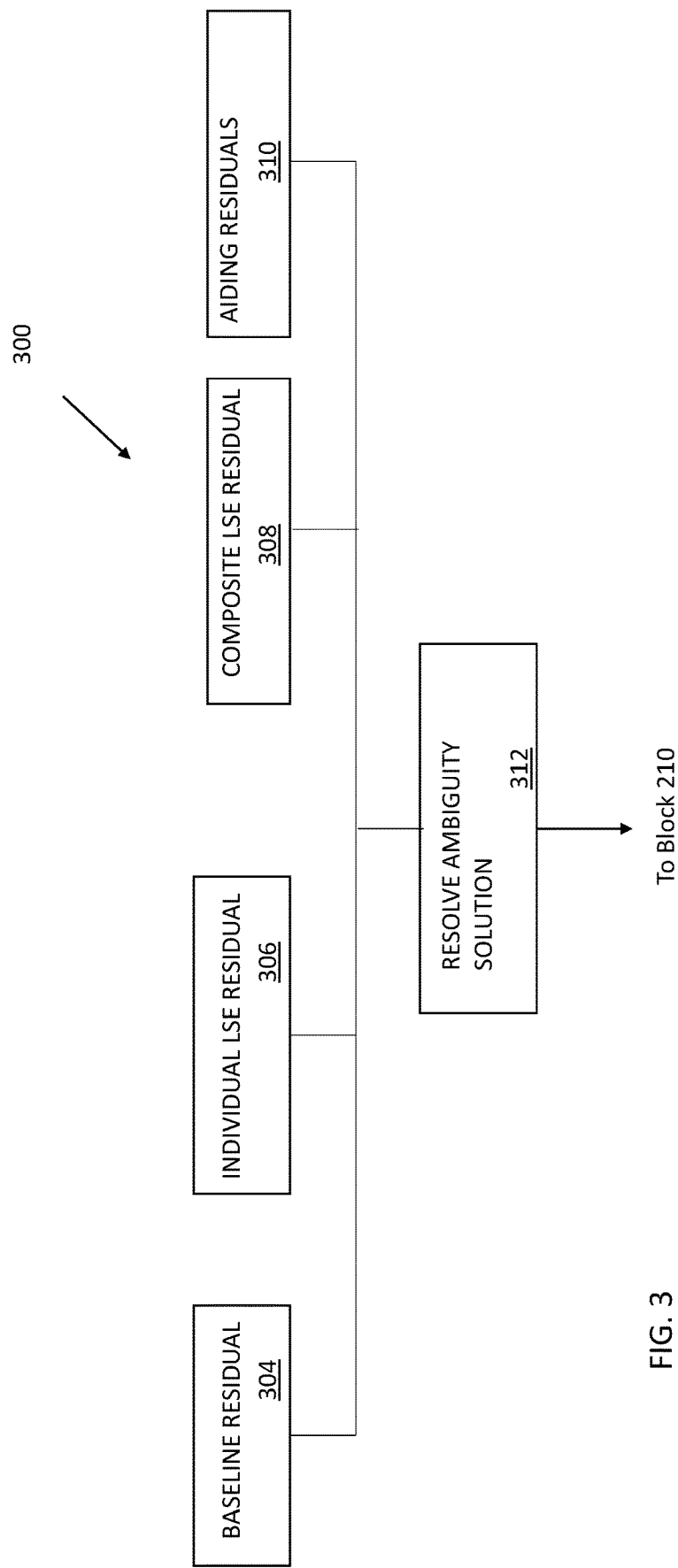
FIG. 3 illustrates an integer ambiguity resolution flow diagram according to one exemplary embodiment.

A first example embodiment used to resolve integer ambiguities at block (208) of FIG. 2 uses a position solution. The result of integer ambiguity resolution is a relative antenna position solution, representing the location of one antenna with respect to the other antenna. This position solution is the result of a LSE solution computed using the differential carrier phase measurements between the antennas and the line-of-sight vectors to the GNSS satellites. A position solution flow diagram 300 that uses a LSE solution is illustrated in FIG. 3.

In this example embodiment multiple forms of residuals are associated with the LSE solution for 3D attitude determination. This approach can be used to resolve the integer ambiguities. As illustrated these methods include baseline residual indicated by block (304), individual LSE residual indicated by block (306), composite LSE residual (or root-sum-squared) indicated by block (308), and aiding residuals indicated by block (310). In an embodiment, the aiding is included for all three Euler angles so that both heading and attitude are estimated from the GNSS carrier phase measurements.

With the baseline residual at block (304), the residual is computed using the difference between the known and computed distance between antennas. The known distance is referred to as the baseline. With the individual LSE residuals indicated by block (306), the LSE residual between each individual differential carrier phase measurement is computed using a single measurement and the LSE solution is computed using all the in-view GPS satellites. This residual can also be described as the measured differential phase minus the predicted differential phase, where the predicted differential phase is based on the latest set of measurements. In other words, the measured differential phase is simply the measured single difference carrier phase using a candidate ambiguity set. The predicted differential phase is the phase that would be predicted based on the antenna relative position that is computed from the current set of differential phase measurements.

With the composite LSE residual indicated by block (308), the square root of the sum of squared (RSS) of the individual LSE residuals are used. With the 3D attitude aiding residual indicated by block (310), these are the differences between attitude resulting from the LSE solution, and any estimated attitude solution computed using a different sensor set 108. An example of this would be the pitch and/or roll information that might be computed from an inertial navigation system 108 that may be located on the same vehicle 102. From one or more of blocks (304, 306, 308, and 310) the integer ambiguity solution is resolved at block (312) and the process continues at block (210) of flow diagram 200 of FIG. 2.

In another example embodiment, the monitoring of the integer ambiguity resolution both instantaneously and over time is used to assure the integrity of the integer ambiguity resolution of block (208). This is illustrated in the instantaneously and over time integer ambiguity resolution flow diagram 400 of FIG. 4. GNSS carrier phase measurements are always subject to short-term random noise because of the nature of the GNSS radio frequency signal tracking measurement method. This is the primary noise mechanism of GNSS. Further GNSS measurements are also subject to long-term (slowly varying) noise caused by signal multipath when the antennas are in a static state near any reflecting surface such as the ground or even aircraft structural surfaces. These multipath errors can be modelled as a lightly-damped $2^{nd}$ order Gauss-Markov process with a characteristic time constant of 100 seconds. Another important characteristic of GNSS errors is they have zero bias. Hence, if carrier phase measurements are processed over a period of time, the effect of the measurement errors can be statistically mitigated by filtering.

As a result of the two types of measurement errors described above, carrier phase integer ambiguity resolution with integrity cannot be assured using a single epoch of data. This is because using only a single epoch may include measurement errors that yield an incorrect integer ambiguity solution. The effects of carrier phase measurement noise are mitigated by considering the residuals described above over windows of time.

Figure 4:
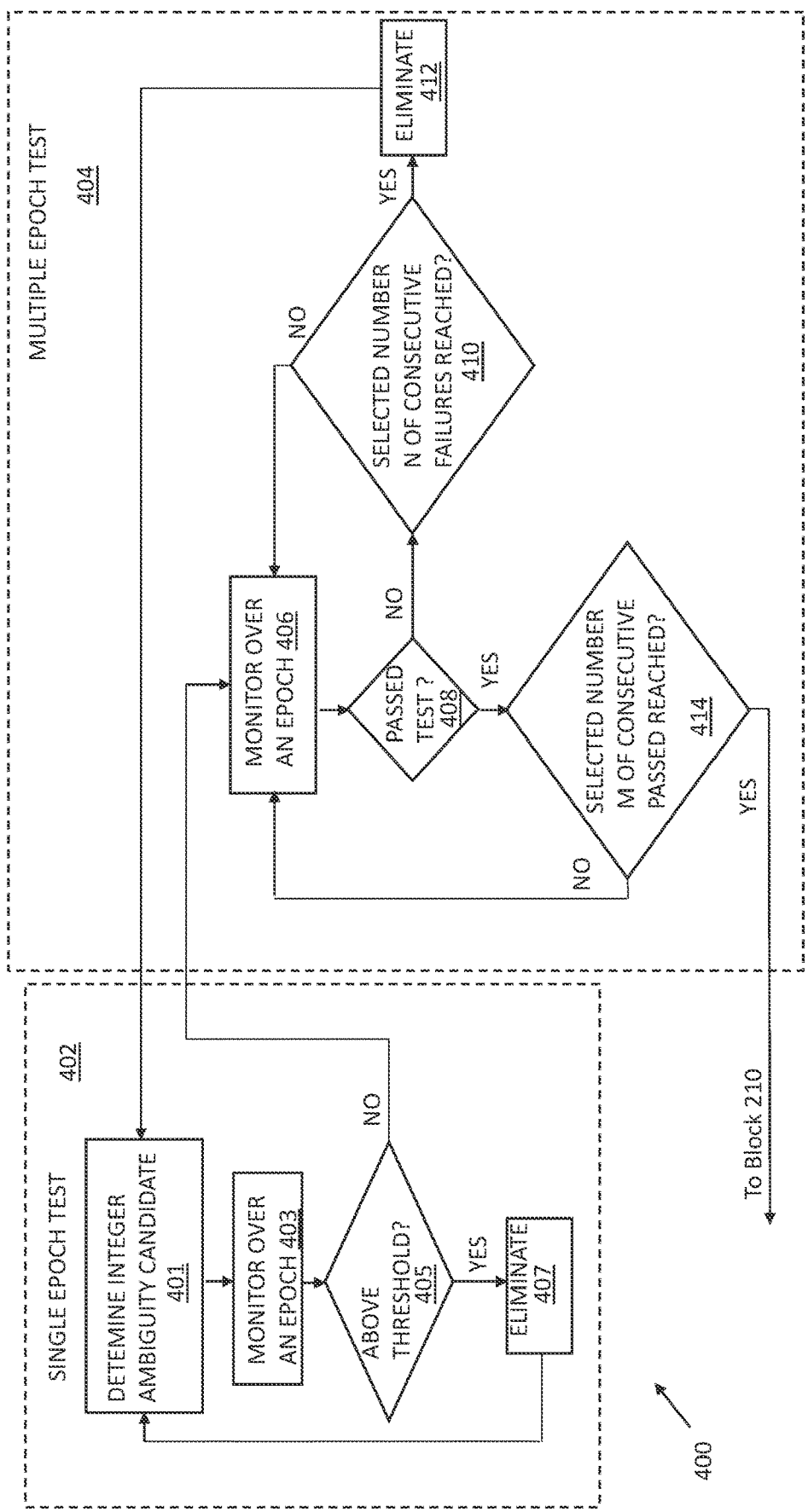
FIG. 4 illustrates an integer ambiguity resolution flow diagram according to one exemplary embodiment.

As illustrated in FIG. 4, this embodiment includes a single epoch test 402 and a multiple epoch test 404. As discussed above, with other flow diagrams provided herewith, the single epoch test 402 and the multiple epoch test 404 in flow diagram 400 are provided as a series of blocks. The sequence of blocks may vary in different embodiments. Hence embodiments are not limited to the sequence as set out in the flow diagrams.

The single epoch test 402 is an instantaneous test that uses large test thresholds to eliminate integer ambiguity candidates whose residuals are larger than could ever occur as a result of measurement errors, even multipath errors that can be up to a few centimeters. The process in this example starts with the determination of an integer ambiguity candidate at block (401). The integer ambiguity candidate is monitored over a single epoch at block (403). It is then determined if the integer ambiguity candidate residuals (from FIG. 3) are above, equal to, or below a selected threshold at block (405). If the residuals are larger or equal to the threshold, in an example embodiment, then the integer ambiguity candidate is eliminated at block (407) and the process continues at block (401) examining another integer ambiguity candidate. If it is determined at block (405) that the integer ambiguity candidate residuals are below the threshold, then the integer ambiguity candidate is passed to the multiple epoch test 404.

The multiple epoch test 404 uses a smaller user selected test threshold to monitor residuals over longer time windows. This multiple epoch test 404 eliminates incorrect integer ambiguity candidates that pass the single epoch test 402 but are still corrupted by the carrier phase measurement errors. The elimination logic of residuals can be flexible. An example of a logic approach implemented by the processor 110 is also illustrated in the flow diagram of FIG. 4.

In this example, the integer ambiguity candidate provided by the single epoch test portion of the flow diagram is monitored over an epoch at block (406). It is then determined if the integer ambiguity candidate residuals (shown in FIG. 3) passed a residual test at block (408). The test eliminates an integer ambiguity candidate if it fails a particular residual test for N consecutive epochs. As illustrated, in this example, if the integer ambiguity candidate does not pass the test at block (408), it is then determined at block (410) if a user selected number N of consecutive failures for the integrity ambiguity candidate has been reached. If a user selected number N of consecutive failures has not been reached, then the process continues at block (406) monitoring the integer ambiguity candidate over another epoch. If a user selected number N of consecutive failures is reached at block (410), then the integer ambiguity candidate is eliminated in block (412). The process then continues at block (401) in the single epoch test portion of the flow diagram.

If a determined integer ambiguity candidate passes the test at block (408), in the example embodiment shown, it is then determined if a select number M of consecutive passes have been reached at step (414). If the consecutive select number M of passes have not been reached, then the process continues at block (406) monitoring the integer ambiguity candidate over another epoch. If a select number M of consecutive passes is reached at block (114), then the 3D attitude is determined at block (210) of flow diagram 200 of FIG. 2. In an embodiment, the 3D attitude is only determined when only one candidate remains or has not been eliminated.

One major advantage of using a multiple epoch test is that it tests residuals over longer time windows which provides a higher likelihood of correct integer ambiguity resolution when the antennas are static in locations where slowly varying multipath error is a major factor. In these cases, only changes to the GNSS constellation geometry can help expose correct and incorrect integer ambiguity candidates. The longer time windows allow for the GNSS geometry to change relative to the vehicle as the satellites orbit the Earth.

Another example embodiment uses a technique to add integrity to the integer ambiguity resolution process. The technique is a constellation sub-set ambiguity resolution (or solution separation). This technique involves resolving integer ambiguities using sub-sets of available differential carrier phase measurements. The principle behind this strategy is that very frequently the vast majority of carrier phase measurements will have small errors that yield the correct integer ambiguity resolution even after differencing the carrier phase measurements along each line-of-sight vector to a satellite. For one specific example, if a carrier phase measurement along 1 line-of-sight vector out of 9 line-of-sight vectors is suffering from large multipath errors, then integer ambiguities resolved using the carrier phase measurement corresponding to the satellite could cause an incorrect ambiguity resolution yielding larger than expected residuals.

In computing integer ambiguities using the 9 measurement sub-sets, each eliminating a single carrier phase measurement, then the one sub-set solution that excluded the carrier phase measurement with large errors would yield much smaller residuals as compared to the full measurement set and the other measurement sub-sets. Thus, the integer ambiguity set computed using the uncorrupted measurement sub-set would stand out as the best and correct set. This specific example can be extended to detecting, identifying, and excluding 2 or more corrupt carrier phase measurements by computing integer ambiguities using sub-sets that exclude 2 or more differential carrier phase measurements. The number of carrier phase measurements that can be eliminated for fault detection and exclusion is limited by the number of satellites in view or, equivalently, the number of available measurements at the time epoch of computation.

Figure 5:
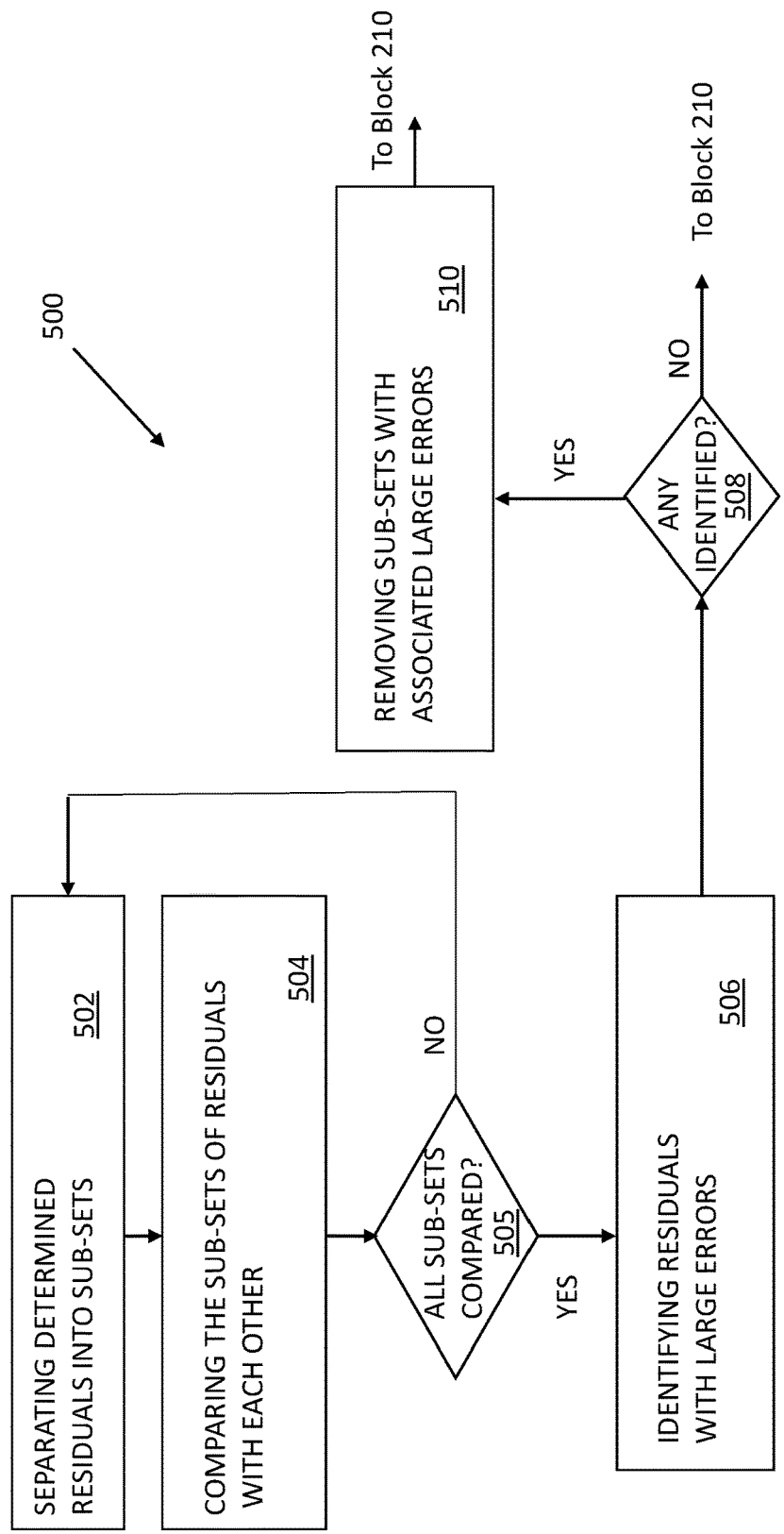
FIG. 5 illustrates an integer ambiguity resolution flow diagram according to one exemplary embodiment.
Figure 9:
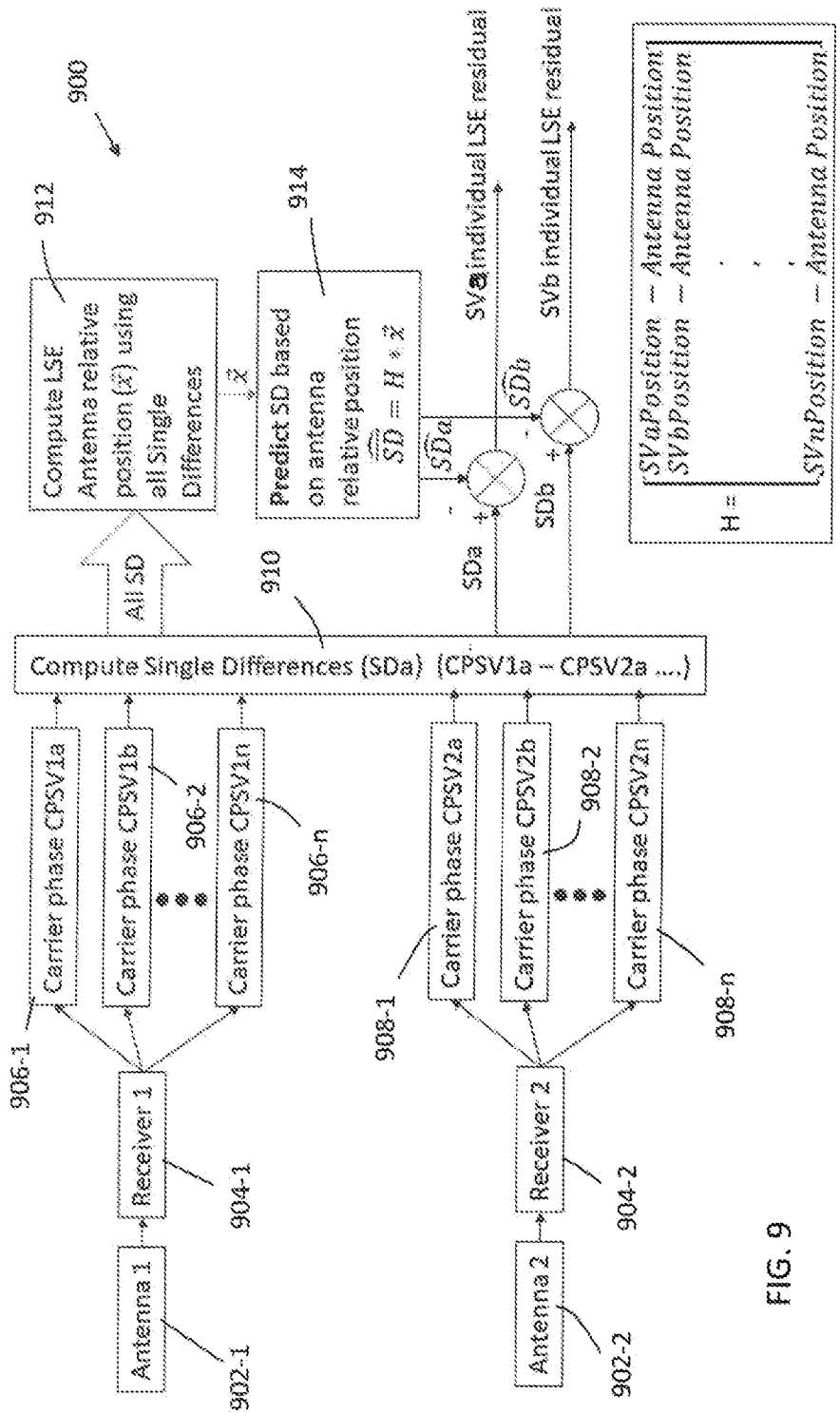
FIG. 9 illustrates a residual flow diagram according to one exemplary embodiment.

An example of a constellation sub-set integrity (solution separation) flow diagram 500 used to add integrity to the integer ambiguity resolution process is illustrated in FIG. 5. As illustrated, the process starts by selecting combinations of differential carrier phase measurements and forming them into sub-sets at block (502) and determining integer ambiguities and their residuals. An explanation on how the residuals are computed in an example embodiment is illustrated in FIG. 9 and discussed below in detail. In one example embodiment, an average of the residuals between sub-sets is compared at block (504). The number of residuals that are different when computed from the combinations of differential carrier phase measurements that constitute the sub-sets depends on the number of bad measurements that need to be identified. It is determined at block (505) if all of the different possible combinations of the residuals have been compared. If they have not been compared, then the process continues at step (502) where the residuals associated with carrier phase measurements are again sorted into sub-sets.

If it is determined that the all the different possible combinations of sub-sets have been compared, then the process continues at block (506) where residuals with large errors are identified. In one embodiment, large errors are identified with a threshold test to determine whether the residual error is too large. In an embodiment, the threshold is a user defined threshold predetermined to identify large errors. If residuals with large errors are identified at block (508), then the associated sub-set is removed at block (510) and the remaining sub-sets are used to determine 3D attitude at step (210) of flow diagram 200 of FIG. 2.

Still another example embodiment used to resolve integer ambiguity resolution 208 is by using an accumulating integrity metric set over time approach. As described above, integer ambiguity resolution can't be executed in a single epoch with integrity. Integrity of the integer ambiguity resolution and, by extension, 3D attitude can only be assured by monitoring an integer ambiguity set over time. This then presents the computational compromise of extending the integer ambiguity resolution time to assure the integrity of the integer ambiguity set while at the same time also minimizing the integer ambiguity resolution time to meet time-to-solution requirements during operation of different modes of a navigation system such as the alignment mode.

The resolved integer ambiguity set must pass the integrity checks over a user-selected time period before the resolved set can be used to determine the vehicle's 3D attitude. If the resolved integer ambiguity set passes the single epoch integrity checks, then it still must be monitored over time to ensure the integer ambiguity set is the correct set. For example, if 300 seconds have passed and all residuals have continued to pass all tests, then it can be declared with an extremely high confidence level that the computed integer ambiguities have been resolved correctly.

Figure 6:
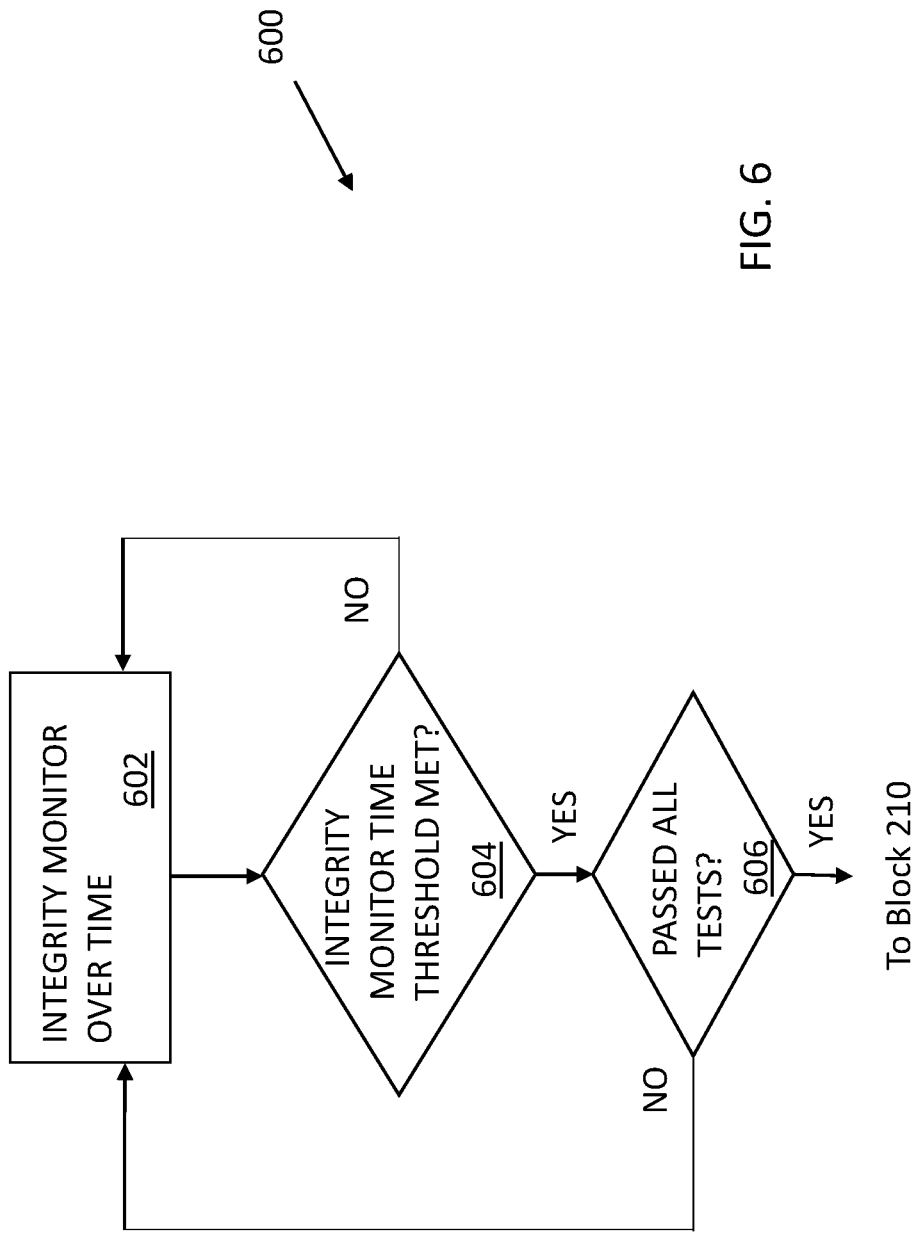
FIG. 6 illustrates an integer ambiguity flow diagram according to one exemplary embodiment.

As example, growing integrity over time approach flow diagram 600 is illustrated in FIG. 6. The process starts by integrity monitoring over time at block (602). At block (604) it is determined if the residuals have passed the integrity monitors for a user selected amount of time. If the user selected amount time has not passed, then the process continues integrity monitoring over time at block (602). If the user selected amount of time has passed at block (604), then it is determined at block (606) if all the residuals have passed all threshold tests over that time period. If the residuals have not passed all the threshold tests over the time period, then the process continues at block (602) monitoring integrity. If the residuals do pass the test during the time period, then the process continues at block (210) of flow diagram 200 of FIG. 2 determining 3D attitude.

Still another example embodiment used to resolve integer ambiguity resolution 208 includes a multiple solution method that uses the different combinations of carrier phase measurements, compares, and then votes between the solutions to identify and exclude faulty carrier phase measurements. This technique involves executing multiple integer ambiguity resolution methods on all the available carrier phase measurements, subsets of the carrier phase measurements, and comparing the output ambiguity sets. Each method is provided the same set of available measurements but may use different subsets of measurements as best suited to each method. There are multiple methods available for integer ambiguity resolution each with different characteristics and error behavior. Some examples include LAMBDA (adapted for fixed baseline), ambiguity search, and motion-based techniques.

Once the integer ambiguities are resolved using each method on combinations of carrier phase measurements, the set of resolved ambiguities from each method can be compared in different ways. First, each integer element of the resolved ambiguity set computed from one ambiguity resolution method can be compared to the corresponding element of the ambiguity set computed from a second ambiguity resolution method and the elements that do not match can be discarded. When comparing resolved integer ambiguities, the conventional method of removing clock bias is applied. That is, between sets of ambiguities from different methods there may be a common (integer) bias between the sets that needs to be removed before comparison. Second, the entire ambiguity set computed using one ambiguity resolution method can be compared to the entire ambiguity set computed using a second integer ambiguity resolution method and declaring the whole solution invalid if there is any mismatch. Third, the baselines computed using one ambiguity resolution method can be compared to the baseline computed using a second integer ambiguity resolution method and declaring the baselines computed from the sub-sets that don't match the other baselines to be the correct integer ambiguity set.

Since ambiguities are all integers, an ambiguity match is simply declared when the (clock-corrected) ambiguities are exactly equal. Any of these ambiguity comparison options will provide integrity as the product of the integrity value of each individual method. In other words, if method 1 provides probability of incorrect fix of 1e-5, and method 2 provides probability of incorrect fix of 1e-6, then the result of comparing the solutions and only accepting them if they match would provide probability of incorrect fix of 1e-11.

Figure 7:
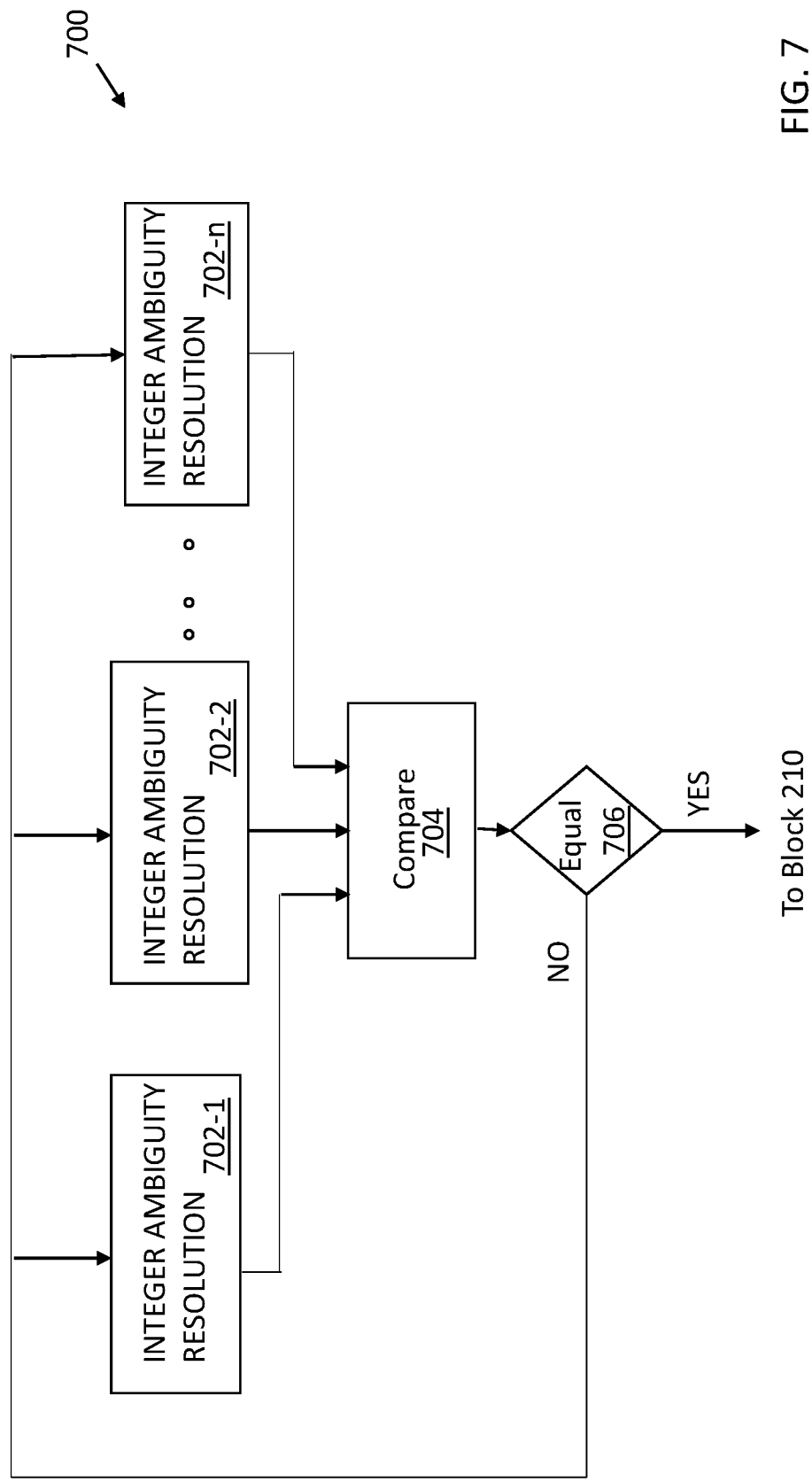
FIG. 7 Illustrates an integer ambiguity resolution flow diagram according to one exemplary embodiment.

An example of a multiple solution flow diagram 700 used to resolve integer ambiguity resolution 208 is illustrated in FIG. 7. As the flow diagram illustrates, the process starts by gathering different integer ambiguity resolutions from blocks (702-1 through 702-n) at block (704). Block (704) compares the resolved integer ambiguity resolutions from blocks (702-1 through 702-n). If the resolutions are equal (or within a set range of being equal) as determined at box (706), then the integer ambiguity resolution is used to determine 3D attitude at block (210) of flow diagram 200 of FIG. 2. In this example, if it is determined at block (706) that the resolutions are not equal, then the process continues at blocks (702-1 through 702-n) with new integer ambiguity resolutions.

Figure 8:
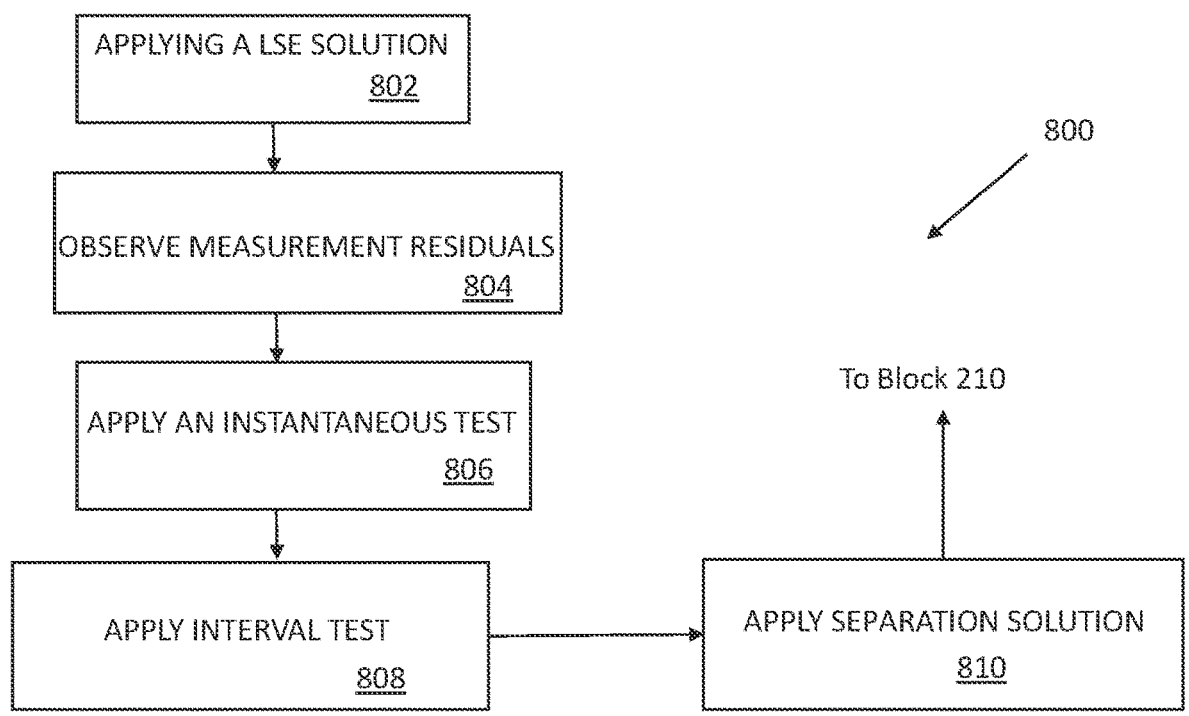
FIG. 8 illustrates another integer ambiguity resolution flow diagram according to one exemplary embodiment.

Further still another embodiment for determining the integrity of integer ambiguity solution in block (208) is provided in the integer ambiguity solution flow diagram 800 of FIG. 8. This example flow diagram starts at block (802) where an LSE solution is applied using differential carrier phase measurements with applied integer ambiguities between the at least two antennas. Measurement residuals are observed at block (804) after the LSE solution is computed. An instantaneous test is then applied at block (806) that compares at least one of the residuals and an RSS of a set of residuals with a select instantaneous threshold to instantly eliminate integer ambiguity candidates whose residuals are larger than could occur as a result of measurement error. An interval test is then applied at block (808) over a period of time to eliminate integer ambiguity candidates that are larger than an interval threshold over a user-selected number of intervals within the period of time to address carrier phase measurement errors. A solution separation function is then applied at block (810) to carrier phase measurements that selectively compares different carrier phase measurement sub-sets solutions with each other. The result is then provided to block 210 of the flow diagram 200 of FIG. 2.

As discussed above, LSE residuals are used in a solution separation function in an embodiment. An example of how the LSE residuals are determined are illustrated in the residual flow diagram 900 of FIG. 9. In this example, a satellite signals from a plurality of satellites are received at antennas 902-1 and 902-2. The signals are communicated to their respective receiver 904-1 and 904-2. The carrier phase of each signal transmitted by each satellite and received at each antenna 902-1 and 902-2 is determined at blocks (906-1 through 906-*n*) and blocks (908-1 through 908*n*). The single differences (SD) of carrier phase measurements for each signal from a satellite are determined at block (910). At block (912) the LSE antenna relative position is determined using all the single differences. A SD based on antenna relative position is predicted at block (914). Each prediction of the antenna relative position at block (914) is mixed with each associated SD from block (910) to determine the individual LSE residual.

Example Embodiments

Example 1 is a vehicle having a three-dimensional attitude determination system. The system includes at least two global navigation satellite system (GNSS) antennas to receive GNSS signals, at least one receiver. The at least one receiver is in communication with the at least two GNSS antennas. The at least one receiver is configured to resolve integer ambiguities associated with GNSS carrier phase measurements from the received GNSS signals. The at least one receiver is further configured to assure the integrity of integer ambiguity solutions associated with the GNSS carrier phase measurements. The at least one receiver is configured to utilize the integer ambiguities to determine a three dimensional attitude of the vehicle taking into consideration the determined integrity of integer ambiguity solutions. Determining the integrity of integer ambiguity solutions includes at least one of, applying a least-square-error solution using differential carrier phase measurements with applied integer ambiguities between the at least two antennas, observing measurement residuals after the least-square-error (LSE) solution is computed and applying an instantaneous test that compares at least one measurement residual with a user selected instantaneous threshold to instantly eliminate integer ambiguity candidates whose residual is larger than could occur as a result of measurement error and applying an interval test over a period of time to eliminate integer ambiguity candidates that are larger than an interval threshold over a user selected number of intervals within the period of time to address carrier phase measurement errors, and applying a solution separation function using combinations of carrier phase measurements that selectively compares different carrier phase measurement sub-sets solutions with each other.

Example 2, includes the vehicle having three-dimensional attitude determination system of Example 1, wherein determining the integrity of integer ambiguity solutions further includes comparing solutions of at least two of the applied integrity of integer ambiguity solutions.

Example 3 includes the vehicle having a three-dimensional attitude determination system of any of the Examples 1-2, wherein determining the integrity of integer ambiguity solutions further includes declaring a resolved integer ambiguity solution when the interval test does not detect integer ambiguity candidates larger than the interval threshold over a user selected period of time.

Example 4 includes the vehicle having a three-dimensional attitude determination system of any of the Examples 1-3, wherein the at least one measurement residual is at least one of a baseline residual that is a difference between a known and a computed distance between the antennas, an individual residual that is a LSE residual between individual differential carrier phase measurements and the LSE solution using all in-view satellites, a composite residual that is a square root of the sum of squared of an individual LSE residual, and an aiding residual that is a difference between attitude resulting from the LSE solution and an estimated attitude solution provided by a different sensor set.

Example 5 includes the vehicle having a three-dimensional attitude determination system of any of the Examples 1-4, wherein the interval test over a period of time to eliminate integer ambiguity candidates that are larger than an interval threshold over a user selected number of intervals within the period of time to address carrier phase measurement errors further comprises at least one of tracking a consecutive number of fails and tracking a consecutive number of passes.

Example 6 includes the vehicle having a three-dimensional attitude determination system of any of the Examples 1-5, wherein the at least one receiver further includes at least one processor configured to resolve the integer ambiguities associated with the GNSS carrier phase measurements from the received GNSS signals and at least one memory unit to at least in part store operating instructions used by the at least one processor to resolve the integer ambiguities associated with the GNSS carrier phase measurements from the received GNSS signals.

Example 7 includes a vehicle having a three-dimensional attitude determination system that includes a plurality of spaced antennas and at least one processor. The plurality of spaced antennas are configured to receive satellite signals. The at least one processor is configured to resolve integer ambiguities associated with global navigation satellite system (GNSS) carrier phase measurements from the received satellite signals. The at least one processor is further configured to determine integrity of integer ambiguity solutions associated with the GNSS carrier phase measurements. The at least one processor is also configured to utilize the integer ambiguities to determine a three-dimensional attitude of the vehicle taking into consideration the determined integrity of integer ambiguity solutions. Determining the integrity of integer ambiguity solutions includes, applying a least-square-error solution using differential carrier phase measurements with applied integer ambiguities between the at least two antennas, observing measurement residuals after the least-square-error solution is computed and applying an instantaneous test that compares at least one measurement residual with a user selected instantaneous threshold to instantly eliminate integer ambiguity candidates whose residuals are larger than could occur as a result of measurement error and applying an interval test over a period of time to eliminate integer ambiguity candidates that are larger than an interval threshold over a user selected number of intervals within the period of time to address carrier phase measurement errors, and applying a solution separation function using combinations of carrier phase measurements that selectively compares different carrier phase measurement sub-sets solutions with each other.

Example 8 includes the vehicle having a three-dimensional attitude determination system of Example 7, further including at least one memory unit to at least in part store operating instructions used by the at least one processor to determine the integrity of the integer ambiguity solutions and at least one sensor to generate signals with three-dimensional attitude relevant information. The at least one sensor is in communication with the at least one processor.

Example 9 includes the vehicle having a three-dimensional attitude determination system of any of the Examples 7-8, wherein the at least one processor is configured to compare solutions of at least two of the applied integrity tests of the integer ambiguity solutions.

Example 10 includes the vehicle having a three-dimensional attitude determination system of any of the Examples 7-9, wherein the at least one processor is configured to declare a resolved integer ambiguity solution when the interval test does not detect integer ambiguity candidates larger than the interval threshold over a user selected period of time.

Example 11 includes the vehicle having a three-dimensional attitude determination system of any of the Examples 7-10, wherein the at least one measurement residual is at least one of a baseline residual that is a difference between a known and a computed distance between the antennas, an individual residual that is a LSE residual between individual differential carrier phase measurements and the LSE solution using all in-view satellites, a composite residual that is a square root of the sum of squared of an individual LSE residual, and an aiding residual that is a difference between attitude resulting from the LSE solution and an estimated attitude solution provided by a different sensor set.

Example 12 includes the vehicle having a three-dimensional attitude determination system of any of the Examples 7-11, wherein the interval test over a period of time to eliminate integer ambiguity candidates that are larger than an interval threshold over a user selected number of intervals within the period of time to address carrier phase measurement errors further comprises at least one of tracking a consecutive number of fails and tracking a consecutive number of passes.

Example 13 includes a method of determining three-dimensional attitude. The method includes receiving satellite signals from a plurality of satellites; measuring a carrier phase of each satellite signal received at plurality of spaced antennas; determining carrier phase differences between the measured carrier phase for each satellite signal from each satellite received at each antenna; resolving integer ambiguities with integrity by, applying a least-square-error solution using differential carrier phase measurements with applied integer ambiguities between at least two of the plurality of antennas, and observing measurement residuals after the least-square-error solution is computed and applying an instantaneous test that compares at least one measurement residual with a user selected instantaneous threshold to instantly eliminate integer ambiguity candidates whose residuals are larger than could occur as a result of measurement error and applying an interval test over a period of time to eliminate integer ambiguity candidates that are larger than an interval threshold over a user selected number of intervals within the period of time to address carrier phase measurement errors; and determining a three-dimensional attitude from the determined carrier phase differences upon completion of the integrity checks of the integer ambiguity resolution.

Example 14 includes the method of Example 13, wherein resolving an integer integrity ambiguity resolution further includes applying a solution separation function to carrier phase measurements that selectively compares different carrier phase measurement sub-sets solutions with each other.

Example 15 includes the method of Example 14, further including identifying phase carrier measurements with large errors with the solution separation function; and removing phase carrier measurements with the identified large errors.

Example 16 includes the method of Example 14, further including comparing results of at least two of the applying a least-square-error solution, the instantaneous test, the interval test and the solution separation function in determining the integer integrity ambiguity resolution.

Example 17 includes the method of any of the Examples 13-16, further including declaring a resolved integer ambiguity solution when the interval test does not detect integer ambiguity candidates larger than the interval threshold over a user selected period of time.

Example 18 includes the method of any of the Examples 13-17, wherein the at least one measurement residual is at least one of a baseline residual that is a difference between a known and a computed distance between the antennas, an individual residual that is a LSE residual between individual differential carrier phase measurements and the LSE solution using all in-view satellites, a composite residual that is a square root of the sum of squared of an individual LSE residual, and an aiding residual that is a difference between attitude resulting from the LSE solution and an estimated attitude solution provided by a different sensor set.

Example 19 includes the method of any of the Examples 13-18, wherein the interval test over a period of time to eliminate integer ambiguity candidates that are larger than an interval threshold over a user selected number of intervals within the period of time to address carrier phase measurement errors further includes tracking a consecutive number of epochs an integer ambiguity candidate is above the interval threshold in eliminating integer ambiguity candidates.

Example 20 includes the method of any of the Examples 13-19, further including tracking a consecutive number of epochs an integer ambiguity candidate is below the interval threshold in resolving the integer ambiguity resolution.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A vehicle having a three-dimensional attitude determination system comprising:
    at least two global navigation satellite system (GNSS) antennas configured to receive GNSS signals;
    at least one receiver in communication with the at least two GNSS antennas; and an inertial navigation system configured to compute pitch and roll estimates for the vehicle;

wherein the at least one receiver is configured to resolve integer ambiguities associated with GNSS carrier phase measurements from the received GNSS signals using combinations of the GNSS carrier phase measurements from in-view satellites to determine whether a satellite is providing faulty carrier phase measurements, the at least one receiver further configured to assure integrity of integer ambiguity solutions associated with the GNSS carrier phase measurements, the at least one receiver configured to utilize the integer ambiguities to determine, using the pitch and roll estimates from the inertial navigation system, a three-dimensional attitude of the vehicle taking into consideration determined integrity of integer ambiguity solutions, wherein determining the integrity of integer ambiguity solutions includes:

applying a least-square-error (LSE) solution using differential carrier phase measurements with resolved integer ambiguities between the at least two antennas;

observing measurement residuals after the LSE solution is computed and applying an instantaneous test that compares at least one measurement residual with a user selected instantaneous threshold to instantly eliminate integer ambiguity candidates whose residuals are larger than could occur as a result of measurement error, and applying an interval test over a period of time to eliminate integer ambiguity candidates that are larger than an interval threshold over a user selected number of intervals within the period of time to address carrier phase measurement errors, wherein the at least one measurement residual includes an individual residual that is a LSE residual between individual differential carrier phase measurements and the LSE solution using all in-view satellites, wherein the interval test over a period of time to eliminate integer ambiguity candidates further comprises tracking a consecutive number of fails of a threshold test; and applying a solution separation function using the combinations of the GNSS carrier phase measurements that selectively compares different carrier phase measurement sub-sets solutions with each other.

2. The vehicle having a three-dimensional attitude determination system of claim 1, wherein determining the integrity of integer ambiguity solutions further comprises:

comparing solutions of at least two of the integrity of integer ambiguity solutions.

3. The vehicle having a three-dimensional attitude determination system of claim 1, wherein determining the integrity of integer ambiguity solutions further comprises:

declaring a resolved integer ambiguity solution when the interval test does not detect integer ambiguity candidates larger than the interval threshold over a user selected period of time.

4. The vehicle having a three-dimensional attitude determination system of claim 1, wherein the at least one measurement residual further includes at least one of a baseline residual that is a difference between a known and a computed distance between the antennas, a composite residual that is a square root of the sum of squared of an individual LSE residual, and an aiding residual that is a difference between attitude resulting from the LSE solution and an estimated attitude solution provided by a different sensor set.

5. The vehicle having a three-dimensional attitude determination system of claim 1, wherein the interval test over a period of time to eliminate integer ambiguity candidates further comprises tracking a consecutive number of passes.

6. The vehicle having a three-dimensional attitude determination system of claim 1, wherein the at least one receiver further comprising:

at least one processor configured to resolve the integer ambiguities associated with the GNSS carrier phase measurements from the received GNSS signals; and at least one memory unit configured to at least in part store operating instructions used by the at least one processor to resolve the integer ambiguities associated with the GNSS carrier phase measurements from the received GNSS signals.

7. A vehicle having a three-dimensional attitude determination system comprising:

a plurality of spaced antennas configured to receive satellite signals; and at least one processor configured to resolve integer ambiguities associated with global navigation satellite system (GNSS) carrier phase measurements from the received satellite signals using combinations of the GNSS carrier phase measurements from in-view satellites to determine whether a satellite is providing faulty carrier phase measurements;

wherein the at least one processor further configured to determine integrity of integer ambiguity solutions associated with the GNSS carrier phase measurements, the at least one processor configured to utilize the integer ambiguities to determine a three dimensional attitude of the vehicle taking into consideration the determined integrity of integer ambiguity solutions, wherein determining the integrity of integer ambiguity solutions includes:

computing a least-square-error (LSE) solution using differential carrier phase measurements that resolves integer ambiguities between the at least two antennas;

observing measurement residuals after the LSE solution is computed and applying an instantaneous test that compares at least one measurement residual with a user selected instantaneous threshold to instantly eliminate integer ambiguity candidates whose residuals are larger than could occur as a result of measurement error and applying an interval test over a period of time to eliminate integer ambiguity candidates that are larger than an interval threshold over a user selected number of intervals within the period of time to address carrier phase measurement errors; and applying a solution separation function using the combinations of the GNSS carrier phase measurements that computes LSE antenna relative position residuals and compares different carrier phase measurement sub-sets solutions with each other using user selected thresholds;

wherein the LSE antenna relative position residuals used in the solution separation function are computed using combinations of single difference carrier phase measurements that are compared to the thresholds and used to identify faulty carrier phase measurements and assure the integrity of the integer ambiguity solutions.

8. The vehicle having a three-dimensional attitude determination system of claim 7, further comprising:

at least one memory unit configured to at least in part store operating instructions used by the at least one processor to determine the integrity of the integer ambiguity solutions; and at least one sensor configured to generate a signal with three-dimensional attitude relevant information, the at least one sensor in communication with the at least one processor.

9. The vehicle having a three-dimensional attitude determination system of claim 7, wherein the at least one processor is further configured to compare solutions of at least two of the integrity of integer ambiguity solutions.

10. The vehicle having a three-dimensional attitude determination system of claim 7, wherein the at least one processor is further configured to declare a resolved integer ambiguity solution when the interval test does not detect integer ambiguity candidates larger than the interval threshold over a user selected period of time.

11. The vehicle having a three-dimensional attitude determination system of claim 7, wherein the at least one measurement residual is at least one of a baseline residual that is a difference between a known and a computed distance between the antennas, an individual residual that is a LSE residual between individual differential carrier phase measurements and the LSE solution using all in-view satellites, a composite residual that is a square root of the sum of squared of an individual LSE residual, and an aiding residual that is a difference between attitude resulting from the LSE solution and an estimated attitude solution provided by a different sensor set.

12. The vehicle having a three-dimensional attitude determination system of claim 7, wherein the interval test over a period of time to eliminate integer ambiguity candidates that are larger than an interval threshold over a user selected number of intervals within the period of time to address carrier phase measurement errors further comprises tracking a consecutive number of fails and tracking a consecutive number of passes.

13. A method of determining three-dimensional attitude, the method comprising:
receiving satellite signals from a plurality of satellites;
measuring a carrier phase of each satellite signal received at a plurality of spaced antennas;
determining carrier phase differences between the measured carrier phase for each satellite signal from each satellite received at each antenna;
resolving integer ambiguities with integrity, using combinations of GNSS carrier phase measurements from in-view satellites to determine whether a satellite is providing faulty carrier phase measurements, by a process comprising:
applying a least-square-error (LSE) solution using differential carrier phase measurements with resolved integer ambiguities between at least two of the plurality of antennas;
observing measurement residuals after the LSE solution is computed and applying an instantaneous test that compares at least one measurement residual with a user selected instantaneous threshold to instantly eliminate integer ambiguity candidates whose residuals are larger than could occur as a result of measurement error, and applying an interval test over a period of time to eliminate integer ambiguity candidates that are larger than an interval threshold over a user selected number of intervals within the period of time to address carrier phase measurement errors, wherein the at least one measurement residual includes an individual residual that is a LSE residual between individual differential carrier phase measurements and the LSE solution using all in-view satellites, wherein the interval test over a period of time to eliminate integer ambiguity candidates further comprises tracking a consecutive number of fails of a threshold test;
applying a solution separation function to the GNSS carrier phase measurements that selectively compares different carrier phase measurement sub-sets solutions with each other; and
determining three-dimensional attitude from the determined carrier phase differences upon completion of integrity checks of the integer ambiguity resolution.

14. The method of claim 13, further comprising:
identifying phase carrier measurements with large errors with the solution separation function; and
removing phase carrier measurements with the identified large errors.

15. The method of claim 13, further comprising:
comparing results of at least two of the applying a LSE solution, the instantaneous test, the interval test, and the solution separation function in resolving the integer ambiguities with integrity.

16. The method of claim 13, further comprising:
declaring a resolved integer ambiguity solution when the interval test does not detect integer ambiguity candidates larger than the interval threshold over a user selected period of time.

17. The method of claim 13, wherein the at least one measurement residual further includes at least one of a baseline residual that is a difference between a known and a computed distance between the antennas, a composite residual that is a square root of the sum of squared of an individual LSE residual, and an aiding residual that is a difference between attitude resulting from the LSE solution and an estimated attitude solution provided by a different sensor set.

18. The method of claim 13, wherein the interval test over a period of time to eliminate integer ambiguity candidates that are larger than an interval threshold over a user selected number of intervals within the period of time to address carrier phase measurement errors further comprises:
tracking a consecutive number of epochs an integer ambiguity candidate is above the interval threshold in eliminating integer ambiguity candidates.

19. The method of claim 13, further comprising:
tracking a consecutive number of epochs an integer ambiguity candidate is below the interval threshold in resolving the integer ambiguity resolution.

20. The method of claim 13, wherein the interval test over a period of time to eliminate integer ambiguity candidates that are larger than an interval threshold over a user selected number of intervals within the period of time to address carrier phase measurement errors further comprises:
tracking a consecutive number of fails and tracking a consecutive number of passes.

* * * * *